(12) United States Patent
Alam et al.

(10) Patent No.: US 8,200,586 B2
(45) Date of Patent: Jun. 12, 2012

(54) METHOD FOR DYNAMIC USAGE BILLING

(75) Inventors: Akm Kamrul Alam, Erie, CO (US); Vyacheslav Barsuk, Longmont, CO (US); Thomas Patrick Kleespies, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 11/767,574

(22) Filed: Jun. 25, 2007

(65) Prior Publication Data

US 2008/0319926 A1    Dec. 25, 2008

(51) Int. Cl.
G06F 17/00 (2006.01)
G06F 9/445 (2006.01)
G06Q 30/00 (2012.01)

(52) U.S. Cl. .................. 705/400; 705/1.1; 717/177
(58) Field of Classification Search .......... 705/400; 717/177
See application file for complete search history.

(56) References Cited

U.S. PATENT DOCUMENTS

| | | | |
|---|---|---|---|
| 6,330,552 B1 * | 12/2001 | Farrar et al. | 705/400 |
| 7,353,212 B1 * | 4/2008 | Darcy et al. | 705/400 |
| 7,379,884 B2 * | 5/2008 | Barsness et al. | 705/1 |
| 2001/0039537 A1 | 11/2001 | Carpenter et al. | |
| 2002/0166117 A1 * | 11/2002 | Abrams et al. | 717/177 |
| 2004/0174823 A1 * | 9/2004 | Steele et al. | 370/252 |
| 2004/0267548 A1 | 12/2004 | Jones | |
| 2005/0114274 A1 | 5/2005 | Dube et al. | |
| 2005/0177635 A1 * | 8/2005 | Schmidt et al. | 709/226 |
| 2006/0020573 A1 * | 1/2006 | Galindo-Legaria et al. | 707/1 |

* cited by examiner

Primary Examiner — Fadey Jabr
(74) Attorney, Agent, or Firm — Schmeiser, Olsen & Watts; Arthur J. Samodovitz

(57) ABSTRACT

A computer-implemented method of calculating a bill for resource usage in an application hosting environment. Resource information is gathered on each computer system resource from a set of resources which are memory resources, SAN resources, CPU resources, hard disk resources, network resources, and middleware resources. A cost per unit of resource is determined for each resource. Usage information is gathered on all resources utilized by at least one computer application during a billing period. A usage sum is determined for each resource utilized which includes a sum of all resource units utilized for each resource. A total usage cost is determined for each resource utilized. The total usage cost is a product of the cost per unit and the usage sum. A dynamic usage bill is created based on a total charge which is a sum of the total usage costs for all resources utilized during the billing period.

22 Claims, 3 Drawing Sheets

METHOD FOR DYNAMIC USAGE BILLING

FIELD OF THE INVENTION

The invention generally relates to a method for billing based on computer system resource usage.

BACKGROUND OF THE INVENTION

A customer accessing and executing a computer application on a shared server in a computer network may be charged for access to the application based on a flat rate or simple access time. Depending on how the application utilizes system resources, the billing method may or may not reflect actual usage of the system. An application utilizing a large percentage of system resources would cost the same as one utilizing only a small fraction. There exists a need for a usage billing method which bills according to actual usage of the computer system resources by an application.

SUMMARY OF THE INVENTION

The invention resides in a method, a product, a process, and a network for calculating a bill for resource usage in an application hosting environment. Resource information is gathered on each computer system resource from a set of computer system resources within a computer network. The computer system resources in the set are memory resources, SAN resources, CPU resources, hard disk resources, network resources, and middleware resources. A cost per unit of resource is determined for each computer system resource in the computer network. Usage information is gathered on all computer system resources that have been utilized by at least one computer application during a billing period. Based on the usage information, a usage sum is determined for each resource utilized by the application(s) during the billing period. The usage sum includes a sum of all resource units utilized for each resource during the billing period. A total usage cost is determined for each resource utilized by the application(s). The total usage cost for each resource is a product of the cost per unit and the usage sum. A dynamic usage bill is created based on a total charge. The total charge is a sum of the total usage costs for all resources utilized by the application(s) during the billing period.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings.

DETAILED DESCRIPTION OF THE INVENTION

Figure 1:
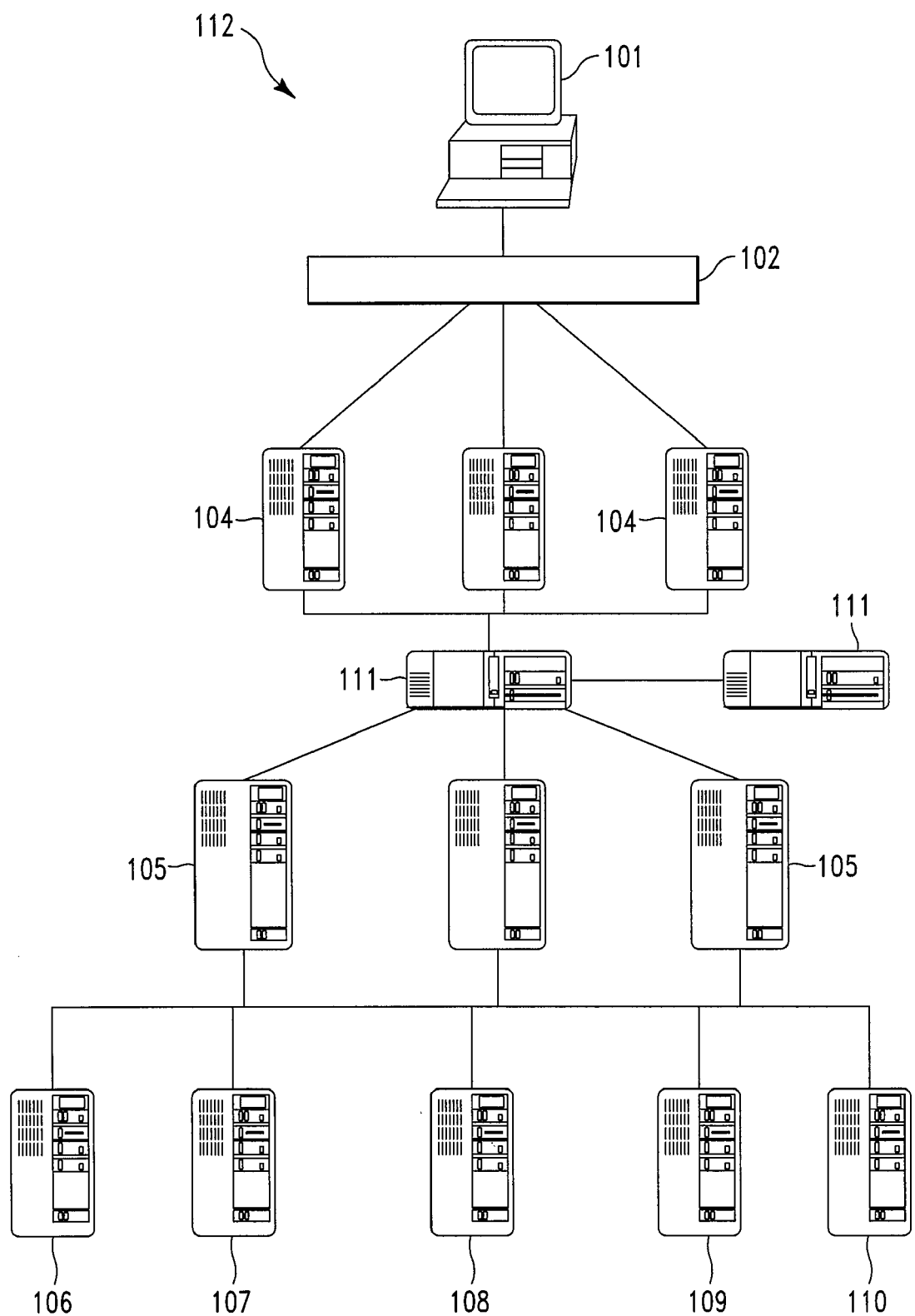
FIG. 1 is an illustration of a computer network, in accordance with embodiments of the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as examples of embodiments. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

FIG. 1 is an illustration of a computer system network 112, wherein a user computer 101 may be connected through a firewall 102 to proxy servers 104. As the user computer 101 executes requests for an application on the network, proxy servers 104 may route the network traffic through a load balance server cluster 111 to application servers 105. The application servers 105 may access other servers such as database servers 106, messaging servers 107, authentication servers 108, batch servers 109, or reporting servers 110. Application servers 105 may access any combination of one or more of these servers.

Computer system resources, as used herein, are defined as Central Processing Unit (CPU) resources, memory resources, hard disk resources, Storage Area Network (SAN) resources, middleware resources, and network resources. Computer system resources may be utilized singularly or in any combination. For example, a combination may comprise CPU resources alone, or in combination with any other computer system resources.

CPU resources, as used herein, are defined as CPU capacity (size), quantity (number of CPU's), and CPU clock cycle. Memory resources, as used herein, are defined as total capacity and access time of Random Access Memory (RAM) and total capacity and access time of Read-only Memory (ROM), where total capacity may consist of the sum of the products of the individual capacities and the quantities of each memory device (such as a RAM chip, for example). Applications utilizing memory resources may vary their usage by the length of memory resource access time. Hard disk resources, as used herein, are defined as hard disk capacity (size), quantity (number of hard disks), disk input/output (amount of data transferred), and access time of system hard disks. Network resources, as used herein, are defined as network devices (such as network cards, routers, switches, and the like), network input/output, bandwidth, and packet size and quantity. Bandwidth may be the amount of information downloadable from a web server over a prescribed period of time. Storage Area Network (SAN) resources, as used herein, are defined as SAN switches, Enterprise Storage Servers (ESS), and total storage capacity. Middleware resources, as used herein, are defined as access time and usage time of middleware such as web server software (such as WEBSPHERE, Apache HTTP Server, and the like) and database management software (such as DB2, ORACLE DATABASE, and the like). Applications may utilize one or more computer system resources through components of those applications, where an application may call or otherwise use a database, web server, message queuing service, or other computer system resource.

Resources may be expressed in resource units, where a resource unit may comprise a preselected incremental amount of the total capacity of a particular resource. For example, a unit of CPU resource may consist of one CPU, one CPU clock cycle, 1% of a single CPU's capacity, or a combination thereof. In another example, a unit of memory resource may consist of 1% of RAM capacity, 1 nanosecond (ns) of access time, or combinations thereof. In another example, a unit of SAN resource may consist of one SAN switch, one Enterprise Storage Server, 1% of total storage capacity, or combinations thereof. In another example, a unit of hard disk resource may consist of one hard disk, 1% of hard disk capacity, 1 gigabit of input/output, 1 millisecond (ms) of access time, or combinations thereof. In another example, a unit of network resources may consist of one network device, 1 gigabit of data input/output, 1 MB of data per second, a packet size of 1 byte, 1 packet, or combinations thereof. In another example, a unit of middleware resources may consist of 1 second of access time, 1 second of usage time, or combinations thereof.

Figure 2:
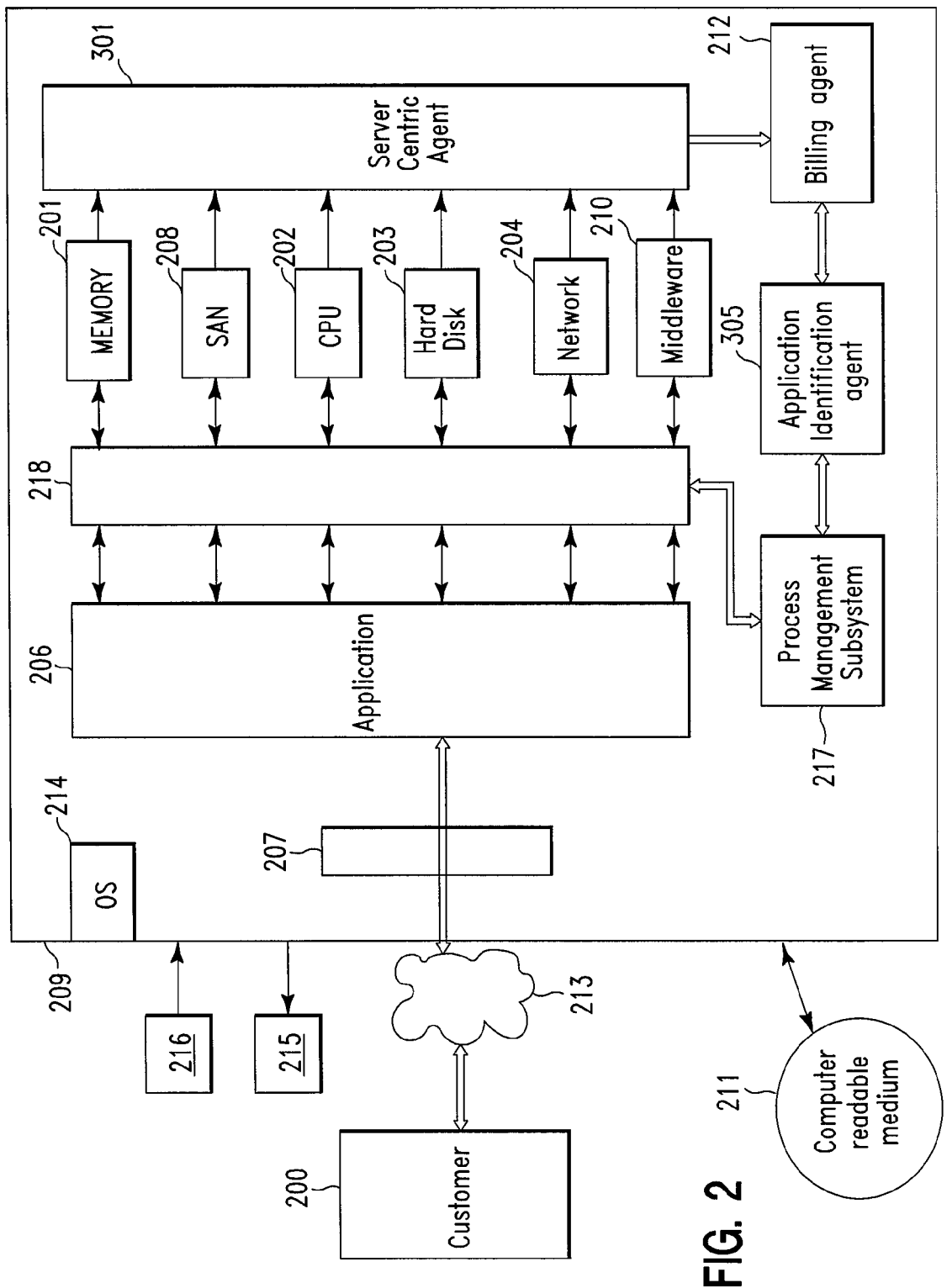
FIG. 2 is an illustration of resource usage by an application 206, in accordance with embodiments of the present invention.

FIG. 2 is an illustration of resource usage by an application 206. The computer network 209 may comprise computer readable memory devices such as, inter alia, a hard disk (e.g., hard disk 203), a floppy disk, a magnetic tape, an optical storage such as a compact disc (CD) or a digital video disc (DVD), random access memory (RAM), a read-only memory (ROM), etc. The memory devices include computer code(s) which comprise at least one computer program (e.g., a billing agent 212, a server centric agent 301, and an application identification agent 305) that comprises computer-executable instructions. A processor (e.g., the CPU 202) coupled to the memory devices executes the computer code(s). The memory devices may include input data. The input data may include input required by the computer code(s). Input devices 216 (such as inter alia a keyboard, a mouse, etc.) and output devices 215 (such as inter alia, a printer, a plotter, a computer screen, a magnetic tape, a removable hard disk, a floppy disk, etc) may be coupled to a processor (e.g. CPU 202) of the computer network 209. The output devices 215 displays output from the computer code(s). The memory devices may be used as a computer usable medium (e.g., computer readable medium 211, the hard disk 203, memory 201) having a computer readable program embodied therein and/or having other data stored therein, wherein the computer readable program comprises the computer code(s). The computer readable medium 211 may comprise, inter alia, a floppy disk, a magnetic tape, an optical storage such as a compact disc (CD) or a digital video disc (DVD), etc. Generally, a computer program product (or, alternatively, an article of manufacture) of a computer system (e.g., the computer network 209) may comprise said computer usable medium. An operating system (OS) 214 may be coupled to and operate within the computer network 209.

Thus the present invention discloses a process for supporting computer infrastructure, integrating, hosting, maintaining, and deploying computer-readable code into the computer network 209, wherein the code in combination with the computer network 209 is capable of performing a method for calculating a bill for computer system resource usage.

A customer 200 may execute one or more applications 206 within a computer network 209 across a communication network 213 (e.g., the internet or an intranet) through a firewall 207. Application 206 may access and utilize any number of several resources such as memory resources 201, SAN resources 208, CPU resources 202, hard disk resources 203, network resources 204, middleware resources 210, and combinations thereof, by initiating system calls through a system call interface 218, wherein the application 206 may initiate system calls relating to the access and use of each resource being utilized. A process management subsystem 217 may generate resource usage information or data, such as in the form of data tables, relating to each system call by the application 206 by receiving system call information from the system call interface 218. An application identification agent 305 may receive, gather, and tabulate the usage information from the process management subsystem 217, such as by reading system call data tables generated by the process management subsystem 217. A server centric agent 301 may gather resource information from resources within the computer network 209 and determine all the resources which are available for utilization by an application 206 within the computer network 209. A billing agent 212 may collect resource information from the server centric agent 301 and collect usage information from the application identification agent 305. In embodiments of the present invention, a dynamic usage billing algorithm may include the server centric agent, 301, the application identification agent 305, the billing agent 212, or combinations thereof.

The present invention may utilize a dynamic usage billing system, where billing may be based on actual computer system resource usage, and may provide the ability to dynamically bill a customer 200 for "on demand" services, such as hosted application usage. Such a method comprises the ability to discern resource utilization by unique application identifier and properly track those exploits. Billing based on a static resource metric or utilization offerings based on a one time assessment of resource usage, may not reflect actual resource usage as neither of these methods may be dynamic to truly reflect the change in resource usage driven by an "on demand" application. Models which focus on maximum usage may result in unfair billing based on the customer's usage. In addition, models which focus on a rigid, manual resource allocation method may have associated complicated billing entries.

Figure 3:
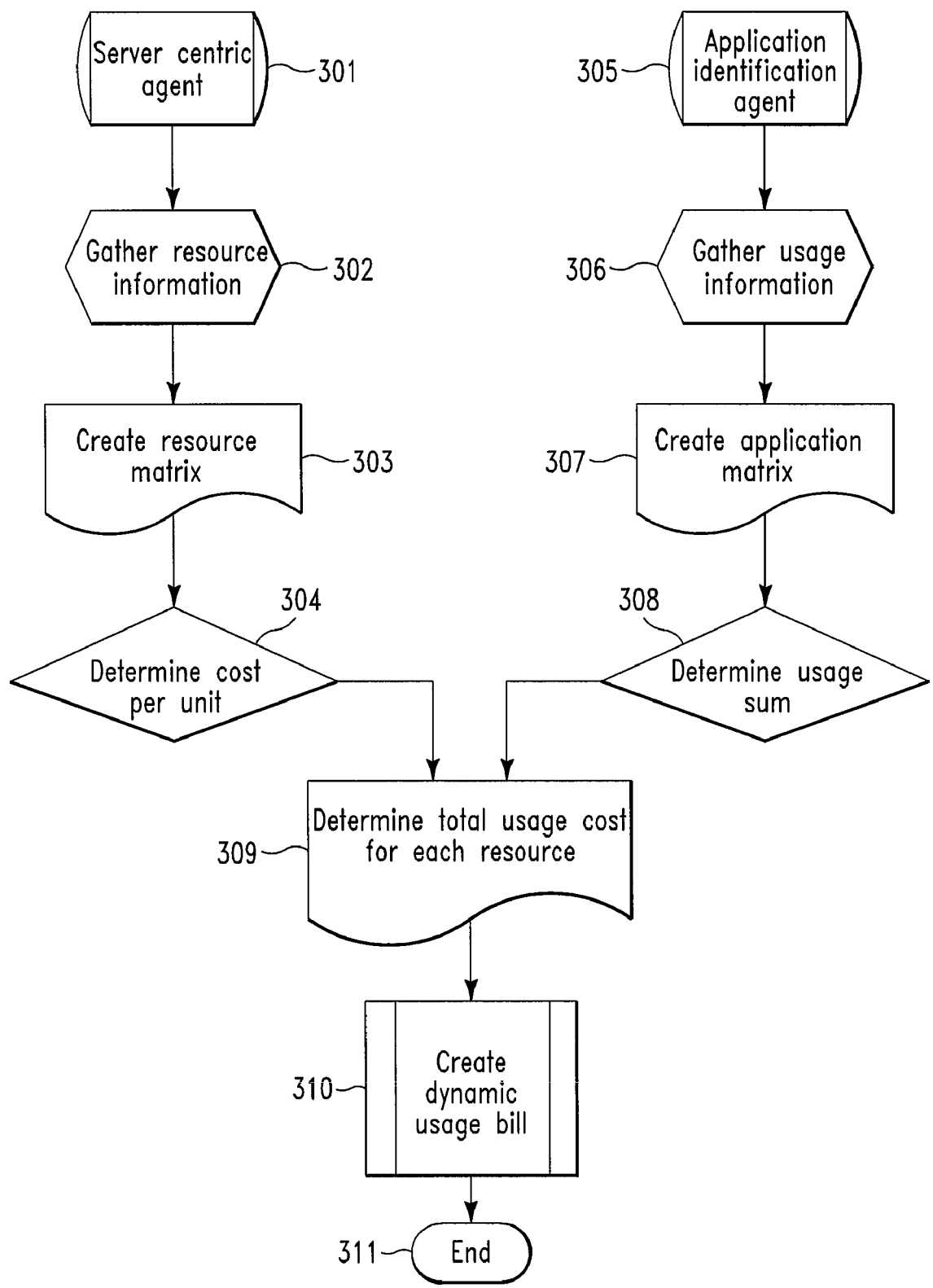
FIG. 3 is a flowchart illustrating an algorithm for dynamic usage billing, in accordance with embodiments of the present invention.

FIG. 3 is a flowchart illustrating a dynamic usage billing algorithm in a network hosting environment. A server centric agent 301 gathers resource information in step 302 on each resource within the computer system, where the resources may consist of CPU resources, memory resources, hard disk resources, SAN resources, middleware resources, network resources, or combinations thereof. The compilation of resource information gathered in step 302 (which may be the sum total of all available computer system resources) may be used by the billing agent to create a resource matrix in Step 303 which may comprise the identification of the resources and the resource information. A matrix may comprise, for example, a list, array, database, a combination of these, or the like. The resource matrix may provide a list of available resources within a computer system for which an application identification agent, such as an application mining algorithm, may determine resource usage by an application.

In Step 304 a billing agent determines a cost per unit of resource for each computer system resource, where, for example, costs may be derived mathematically from the total number of units for each resource and the associated cost to the system for each resource. Such costs may be derived from hardware costs, software costs, market pricing for usage, and the like. If resources are added or removed from the computer system or network (for example, the addition of memory resources), the resource matrix may be updated to reflect the changes, and the associated cost per unit of resource may be adjusted as appropriate (for example, the addition of memory resources may reduce the cost per unit of the same).

In step 306, an application identification agent 305 gathers usage information on all computer system resources that have been utilized by a computer application during a billing period, including the identities of all running applications, resources used by the running applications, and how the resources are used such as the amount of each resource that is used by the application. The application identification agent 305 may identify each application component by network relation to each server.

The application identification agent 305 may identify all running applications by receiving information from a process management subsystem, such as a process list on a UNIX system, a scheduler on a WINDOWS system, or a job queue on a VM system, for example. The application identification agent 305 may ignore system processes and identify targeted applications for which a bill is intended to be generated. The billing agent may instruct the application identification agent 305 to collect the usage information for each targeted application during a billing period, where the application identification agent 305 may monitor and tabulate application system calls from applications by reading system call data generated by the process management subsystem for each targeted application.

The usage information for each resource may be expressed as the number of resource units of each computer system resource utilized by an application during the billing period. The usage information gathered may allow for billing based on a number of different metrics, where some of the metrics may include average and peak usage of CPU resources, memory resources, network resources, disk resources, middleware resources, and SAN resources. All of the metrics may be based directly on the execution and related transactions of the applications. Since the metrics may correlate specifically to application usage of resources, regardless of which server within the network those resources are located on, a complete compilation may be provided regarding resource usage by applications. These metrics may be customized if there are different rates in different billing periods (e.g. prime shift and off-shift rates), where each of these business rules may be defined by the administrators of the network environment.

An application matrix may be created in step 307 by the billing agent comprising the usage information gathered in step 306 and reflecting the usage of each resource the application utilizes. The application identification agent 305 may gather usage information for more than one application and the billing agent may create application matrices reflecting resource usage for each application. The usage may be expressed in terms of resource units, where a resource unit may comprise a preselected incremental amount of the total capacity of a particular resource.

The total application resource usage is determined in step 308 by the billing agent for each resource during a billing period, where the total application resource usage may be a usage sum, which may be based on the usage information in the application matrix (or multiple matrices in the case of multiple applications). The usage sum may be the sum of all the resource units utilized of each resource by an application (or multiple applications), during the billing period. For example, during a two week billing period, an application may use 300 units of CPU resources and 100 units of memory resources during week one, and 200 units of CPU resources and 200 units of memory resources during week two, where the usage sum for CPU usage would be 500 units and the usage sum for memory usage would be 300 units. A billing period may be a predetermined period of time, such as a month or a year, during which charges for application resource usage are accumulated.

In step 309, the application resource usage determined in step 308 and the cost per unit determined in step 304 are used by the billing agent to determine the total usage cost for each resource used by the application during the billing period. In one example, the total usage cost for each resource may be the product of the cost per unit resource and the application resource usage for that resource during the billing period.

In step 310 the billing agent creates a dynamic usage bill based on a total charge, where the total charge is the sum of the total usage costs for all resources utilized by the application during the billing period. The dynamic usage bill may be in printed form, displayed (such as on a computer screen), stored electronically, combinations of these, and the like. The dynamic usage bill may present the costs for each resource in any format such as itemized for each resource, itemized for each application, summarized as one cost for all applications and all resources used, combinations of these, and the like. The process ends in step 311.

Adjustments may be made as a result of predetermined customer agreements, sales promotions, specials, combinations of these, and the like. Such adjustments may be made by applying a business logic, such as a mathematical adjustment, to the cost per unit of resource for one or more resources, the usage sum for one or more resources, the total usage cost for one or more resource usages, the total charge, or combinations of these. The mathematical adjustment may be an increase or decrease. The selection of where to apply the adjustment depends on the nature and reason for the adjustment. For example, a sales promotion that offers a 50% discount on disk storage unit charges when disk usage exceeds 20 Gigabytes (GB), may multiply the cost per resource unit for disk storage resources by 0.5 when the total resource usage for disk storage exceeds 20 resource units, where a resource unit of disk storage is 1 GB.

The present invention may allow the customer to examine how their current application usage is being charged and adjust their usage or budget to accommodate their needs. This may be accomplished manually by the customer or automatically by an algorithm within the present invention. For example, a customer may have one or more applications that use a large amount of a more expensive resource (for example, CPU time). Determining which resources are considered to be expensive and what constitutes a large amount may be accomplished by the customer, where the customer may have budget constraints which may provide a limit for one or both resource cost and usage, for example, or the algorithm may provide a listed hierarchy (by cost per unit, for example) of the resources and common limits for their use. The customer or algorithm may then reduce the use of the application, or may stop using the application and locate and use within the application hosting environment an alternate application to replace the original application, where the alternate application may accomplish the desired task with lower resource usage requirements than the original application, where lower resource usage may be that which is below the limit. The customer may change the limit provided by the budget constraints or adjust the budget to accommodate a higher limit.

In another example, when planning a budget, a customer may be able to predict costs associated with each projected application used and therefore plan funding accordingly. Accordingly, the customer may have control over the total usage cost they may be billed for, which resource usages may be contributing to the total usage cost, and which applications may be using the resources that may contribute to the total cost. Such control may provide the ability to propose hypothetical scenarios for growth or budget development, and may allow the customer to choose where they are investing and cap areas that may not be as important to performance or response time. For example, for lower priority application usage which may contribute to a more costly portion of the total charge, a customer may reduce or eliminate usage of such an application to allocate spending to higher priority applications. An algorithm within the present invention may automatically present information to the customer such as projected resource usage, projected total usage costs, projected total charges, a hypothetical usage bill, or combinations of these based on proposed application usage by a customer or resource utilization from a prior billing period. Such information may assist a customer with budget planning for proposed application use.

In another embodiment of the present invention, an algorithm may automatically adjust or otherwise make changes to an application's access to computer system resources based on a predetermined limit, in order to accommodate budget limits or other constraints. This may be accomplished by stopping resource utilization or reducing resource usage to a different predetermined level. For example, a customer may define a limit to the usage sum per billing period, where application usage by the customer may be stopped by the algorithm when the usage sum reaches the limit. Such a limit may be set for any part of the dynamic usage billing process, such as the usage sum, resource units, the total usage cost, the total charge, or combinations of these.

The present invention may allow for flexibility to adapt to grid- or network-based computing which may have the capability of moving applications around a network, using resources from many different servers as necessary to allow for the completion of the work package. If applications are stopped or moved to where they access different resources, the total cost may be changed.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A computer-implemented method of calculating a bill for resource usage in an application hosting environment, said method comprising:
    gathering resource information on each computer system resource of a set of computer system resources within a computer network, wherein said computer system resources in said set consist of memory resources, SAN resources, CPU resources, hard disk resources, network resources, and middleware resources;
    determining a cost per unit of resource for each said computer system resource in said computer network;
    gathering usage information on all computer system resources that have been utilized by at least one computer application during a billing period;
    determining, based on said usage information, a usage sum for each said resource utilized by said at least one application during the billing period, wherein said usage sum comprises a sum of all resource units utilized for each said resource during said billing period;
    a processor of a computer determining a total usage cost for each said resource utilized by said at least one application, wherein said total usage cost for each resource is a product of said cost per unit and said usage sum;
    said processor creating a dynamic usage bill based on a total charge, wherein said total charge is a sum of said total usage costs for all resources utilized by said at least one application during the billing period.

2. The method of claim 1, wherein said memory resources in said set comprise total capacity and access time of Random Access Memory and total capacity and access time of Read-only Memory.

3. The method of claim 1, wherein said SAN resources in said set comprises SAN switches, Enterprise Storage Servers, and total storage capacity.

4. The method of claim 1, wherein said CPU resources in said set comprises CPU capacity, CPU quantity, and CPU clock cycle.

5. The method of claim 1, wherein said hard disk resources in said set comprises hard disk capacity, hard disk quantity, hard disk input/output, and access time of system hard disks.

6. The method of claim 1, wherein said network resources comprises in said set network devices, network input/output, bandwidth, packet size, and packet quantity.

7. The method of claim 1, wherein said middleware resources in said set comprises access time and usage time of middleware.

8. The method of claim 1, further comprising the step of applying a business logic to the cost per unit of resource for at least one resource, the usage sum for at least one resource, the total usage cost for at least one resource, the total charge, or combinations thereof, wherein said business logic consists of an adjustment based on a predetermined customer agreement, a sales promotion, or a combination thereof, wherein said adjustment is an increase or a decrease.

9. The method of claim 1, wherein said gathering comprises utilizing an application mining algorithm.

10. The method of claim 1, wherein said at least one application is more than one application.

11. The method of claim 1, wherein said all computer system resources that have been utilized comprise at least two computer system resources of the set of computer system resources.

12. The method of claim 1, wherein said all computer system resources that have been utilized comprise at least three computer system resources of the set of computer system resources.

13. The method of claim 1, wherein said all computer system resources that have been utilized comprise six computer system resources of the set of computer system resources.

14. The method of claim 1, further comprising after said gathering said usage information, adjusting access of said at least one application to said computer system resources in the set of computer system resources based on a predetermined limit for said total usage cost, said total charge, or a combination of thereof.

15. The method of claim 14, wherein said adjusting said access comprises stopping resource utilization of said computer system resources.

16. The method of claim 1, further comprising after said creating a dynamic usage bill presenting to a customer projected resource usage, projected total usage costs, projected total charges, a hypothetical usage bill, or combinations thereof based on proposed application usage by said customer or based on resource utilization from a prior billing period.

17. The method of claim 1, further comprising after said gathering said usage information, locating and utilizing within said application hosting environment an alternate at least one application to replace said at least one application, said alternate application having lower resource usage requirements, based on a predetermined limit for said usage sum, said total usage cost, said total charge, or combinations of thereof.

18. The method of claim 1, wherein said usage information is based on application system calls.

19. A computer program product for calculating a bill for resource usage in an application hosting environment, said computer program product comprising:
    a computer readable storage medium;
    first program instructions for gathering resource information on each computer system resource of a set of computer system resources within a computer network, wherein said computer system resources in said set consist of memory resources, SAN resources, CPU resources, hard disk resources, network resources, and middleware resources;

second program instructions for determining a cost per unit of resource for each said computer system resource in said computer network;

third program instructions for gathering usage information on all computer system resources that have been utilized by at least one computer application during a billing period;

fourth program instructions for determining, based on said usage information, a usage sum for each said resource utilized by said at least one application during the billing period, wherein said usage sum comprises a sum of all resource units utilized for each said resource during said billing period;

fifth program instructions for determining a total usage cost for each said resource utilized by said at least one application, wherein said total usage cost for each resource is a product of said cost per unit and said usage sum;

sixth program instructions for creating a dynamic usage bill based on a total charge, wherein said total charge is a sum of said total usage costs for all resources utilized by said at least one application during the billing period, wherein the first program instructions, the second program instructions, the third program instructions, the fourth program instructions, the fifth program instructions, and the sixth program instructions are stored on the computer readable storage medium.

20. A process for deploying computing infrastructure, said process comprising integrating computer-readable code into a computing system, wherein the code in combination with the computing system is capable of performing the method of calculating a bill for resource usage in an application hosting environment, said method comprising:

gathering resource information on each computer system resource of a set of computer system resources within a computer network, wherein said computer system resources in said set consist of memory resources, SAN resources, CPU resources, hard disk resources, network resources, and middleware resources;

determining a cost per unit of resource for each said computer system resource in said computer network;

gathering usage information on all computer system resources that have been utilized by at least one computer application during a billing period;

determining, based on said usage information, a usage sum for each said resource utilized by said at least one application during the billing period, wherein said usage sum comprises a sum of all resource units utilized for each said resource during said billing period;

a processor of a computer determining a total usage cost for each said resource utilized by said at least one application, wherein said total usage cost for each resource is a product of said cost per unit and said usage sum;

said processor creating a dynamic usage bill based on a total charge, wherein said total charge is a sum of said total usage costs for all resources utilized by said at least one application during the billing period.

21. A computer network for calculating a bill for resource usage in an application hosting environment, said computer network comprising:

a processor;

a computer readable memory;

a computer readable storage medium;

first program instructions for gathering resource information on each computer system resource of a set of computer system resources within a computer network, wherein said computer system resources in said set consist of memory resources, SAN resources, CPU resources, hard disk resources, network resources, and middleware resources;

second program instructions for determining a cost per unit of resource for each said computer system resource in said computer network;

third program instructions for gathering usage information on all computer system resources that have been utilized by at least one computer application during a billing period;

fourth program instructions for determining, based on said usage information, a usage sum for each said resource utilized by said at least one application during the billing period, wherein said usage sum comprises a sum of all resource units utilized for each said resource during said billing period;

fifth program instructions for determining a total usage cost for each said resource utilized by said at least one application, wherein said total usage cost for each resource is a product of said cost per unit and said usage sum;

sixth program instructions for creating a dynamic usage bill based on a total charge, wherein said total charge is a sum of said total usage costs for all resources utilized by said at least one application during the billing period, wherein the first program instructions, the second program instructions, the third program instructions, the fourth program instructions, the fifth program instructions, and the sixth program instructions are stored on the computer readable storage medium for execution by the processor via the computer readable memory.

22. A computer-implemented method of determining a bill for resource usage by an application executing in a server, said method comprising the steps of:

gathering usage information by said application of resources consisting of memory resources, SAN resources, CPU resources, hard disk resources, and middleware resources during a billing period; and a processor of a computer determining a bill for said application based on said application's usage of said resources during said billing period.

* * * * *